USOO5623455A

United States Patent [19]
Norris

[11] Patent Number: 5,623,455
[45] Date of Patent: Apr. 22, 1997

[54] APPARATUS AND METHOD FOR ACQUIRING SEISMIC DATA

[75] Inventor: Michael W. Norris, Cypress, Tex.

[73] Assignee: Western Atlas International, Inc., Houston, Tex.

[21] Appl. No.: 450,199

[22] Filed: May 25, 1995

[51] Int. Cl.⁶ .................................................. G01V 1/22
[52] U.S. Cl. ............................................. 367/76; 367/13
[58] Field of Search .................................... 367/13, 55, 59, 367/56, 76

[56] References Cited

U.S. PATENT DOCUMENTS

| 3,946,357 | 3/1976 | Weinstein et al. | 367/77 |
|---|---|---|---|
| 4,152,691 | 5/1979 | Ward | 367/43 |
| 4,443,713 | 4/1984 | Layton | 307/260 |
| 4,635,235 | 1/1987 | Bearden | 367/13 |

Primary Examiner—Ian J. Lobo
Attorney, Agent, or Firm—E. Eugene Thigpen

[57] ABSTRACT

A seismic data acquisition system utilizing a plurality of remote units, each remote unit being coupled to a plurality of receivers placed spaced apart on the earth's surface is provided. The remote units acquire seismic data from their associated receivers in response to a seismic shock wave induced at a selected point on the earth and transmit the acquired seismic data to a recorder over a separate channel associated with each receiver. A signature device located at a known receiver location transmits a data sequence containing an embedded time-invariant code that is unique to the signature device to the recorded during the recording cycle. The signature device data sequence and its location are pre-recorded in the recorder. The recorder utilizing the stored data sequence and the data sequence transmitted by the signature device during the recording cycle to map the seismic data channels corresponding to the locations of their associated receivers. The invention for acquiring seismic data contains the steps of: (a) acquiring seismic data from a plurality of seismic sensors placed spaced apart on the earth; (b) transmitting the seismic data acquired from the seismic sensors to the recorder over a separate channel associated with each receiver; (c) transmitting a data sequence having an embedded time-invariant code from a signature device located at a sensor location; and (d) utilizing the data sequence transmitted by the signature device to map the seismic data associated with each channel corresponding to the location of its seismic sensors.

17 Claims, 2 Drawing Sheets

| PRA | UKP | OPTIONAL DATA | POA |
|---|---|---|---|
| PREAMBLE | TIME INDEPENDENT UNIQUE SEQUENCE | DETECTOR COORDINATES, DETECTOR STATION, TIME AND / OR COMMENTS | POSTAMBLE |

FIG. 2

APPARATUS AND METHOD FOR ACQUIRING SEISMIC DATA

BACKGROUND OF THE INVENTION

1. Field of the Invention

This invention relates generally to the field of seismic exploration and more particularly to a seismic data acquisition system and method wherein time invariant encoded signals are injected into the seismic data to ensure correct mapping of the channel assignments of the various detector stations in the system to the true geographic locations of their corresponding detector stations.

2. Description of the Related Art

In seismic exploration, to obtain geophysical information about the earth's sub-surface, shock waves are induced into the earth. The shock waves propagate through the earth's subsurface and are reflected back to the earth's surface by the subterranean interfaces. The reflected seismic waves are detected by a plurality of detectors or receivers implanted on the earth's surface. A geophone or a group of geophones is typically used as a receiver or detector.

In a typical seismic data acquisition system, spaced apart receivers are placed along parallel lines over the terrain to be surveyed. A plurality of remote acquisition units, referred generally herein as "RU", each RU coupled to a certain number of receivers (typically between 1–6), acquire data from their associated receivers. A plurality of data acquisition units, referred generally herein as "DAU", each DAU coupled to a plurality of RU's, receive data from their associated RU's and transmit such received data to a central recording unit, generally referred to herein as a "recorder", which records the data from desired receivers on a storage media during each data acquisition cycle. The recorder is typically placed in a truck or at some other remote location. The recorded data are processed to provide maps of the cross-sections of the earth's subsurface using known techniques.

In recent years, three dimensional ("3D") seismic surveys have become common because they provide more comprehensive geophysical information compared to two dimensional surveys. Three dimensional surveys are typically performed using survey geometries that form a grid, wherein several receiver lines, each receiver line containing a large number spaced apart receivers, are placed in parallel on the terrain to be surveyed. Such layouts or grids may be between 12–30 kilometers long and three to five (3–5) kilometers wide containing more than six thousand (6000) receivers.

To place the receivers and the related equipment on the terrain, a land surveyor stakes out the precise location that each receiver is to occupy. The location is determined by known methods, such as by determining the geographic coordinates of the receiver station by utilizing global positioning systems or other known techniques. The geographic location of each receiver in a seismic spread is typically stored in a computer. Each such receiver provides data over one channel. Thus, in a seismic spread, there are as many data channels as there are receivers and each receiver is associated with one data channel.

Due to the large magnitude and complexity of the modern seismic spreads, it is critical that seismic data acquired from each channel is recorded corresponding to the correct geographic (physical) location of its associated receiver. To accomplish the correct mapping of each channel of seismic data with the correct location of its associated receiver, it is common practice to short a selected number of receivers so that no seismic data is provided by such receivers, i.e., such channels are made "dead." By knowing the actual physical location of such dead channels, the computer correlates the remaining data channels with the known dead channels to ensure that the seismic data (traces) received by the recorder is correctly recorded corresponding to the true geographic location of their associated receivers. This method is flawed in that dead channels frequently exist in seismic spreads due to equipment failure or operator error. Also, valuable seismic data are lost for the receiver stations corresponding to the dead channels, which is very undesirable. Alternatively, in the prior art, the polarity of certain predetermined number of receivers is reversed. This method is undesirable because polarity reversals also naturally occur, mostly due to operator error, and further due to the fact that any such data received by the recorder must by corrected before processing such data. It is thus desirable to have a seismic data acquisition system that provides an independent means for mapping the locations of the data channels to the true geographic locations of their associated receiver stations.

The present invention addresses the above-noted problems and provides a data acquisition system wherein devices placed at certain receiver stations inject time invariant encoded signals into the seismic data, which information is used to ensure that the Recorder records the seismic data corresponding to the true geographic locations of their respective receiver stations.

SUMMARY OF THE INVENTION

This invention provides a seismic data acquisition system which contains a plurality of remote units deployed in a desired region according to a desired grid pattern. Each such remote unit is coupled to a plurality of receivers placed spaced apart on the earth's surface. The remote units acquire seismic data from their associated receivers in response to a seismic shock wave generated by a source at a selected point on the earth and transmit the acquired seismic data to a data acquisition recorder during a data recording cycle. A signature device located at a known receiver location transmits a data sequence containing an embedded time-invariant code that is unique to the signature device to the recorder during the recording cycle. A computer coupled to the acquisition recorder has stored therein the data sequence for the signature device and it utilizes the stored data sequence and the data sequence transmitted by the signature device during the recording cycle to map the seismic data from the sensors to their true locations.

In one aspect, the method of the present invention for acquiring seismic data contains the steps of: (a) acquiring seismic data from a plurality of seismic sensors placed spaced apart on the earth; (b) transmitting the seismic data acquired from the seismic sensors to a recorder; (c) transmitting a data sequence having an embedded time-invariant code from a signature device located at a selected sensor location; and (d) utilizing the data sequence transmitted by the signature device to map the seismic data corresponding to the true geographic location of their corresponding seismic sensors.

Examples of the more important features of the invention have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIG. 2 shows an example of a data sequence transmitted by a signature device used in FIG. 1.

DESCRIPTION OF THE PREFERRED EMBODIMENT

Figure 1:
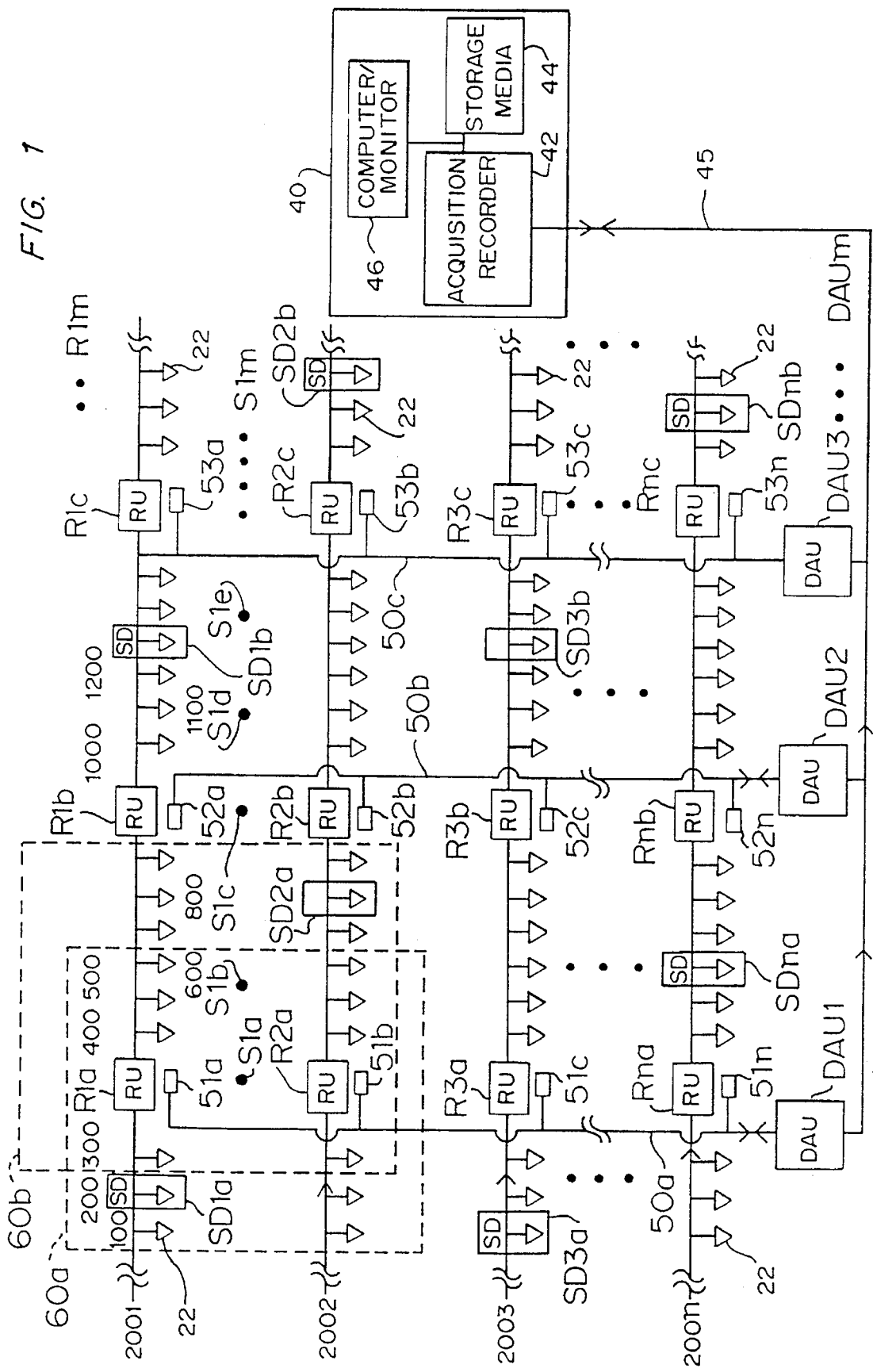
FIG. 1 shows a seismic survey geometry wherein a number of signature devices are placed at certain receiver stations according to the present invention.

FIG. 1 shows an example of a seismic survey geometry or seismic spread according to the present invention. It contains a plurality of substantially parallel receiver station lines 2001–200n, each receiver station line containing a plurality of substantially equally spaced apart receivers 22. The seismic spread is generally symmetrical, i.e., the receivers 22 in adjacent receiver station lines are located substantially along vertical lines, designated as 100, 200, 300 and so on. In a preferred embodiment, receivers are placed about twenty-five (25) meters apart. A plurality of remote units, generally designated herein as "RU", are coupled to the receiver station lines 2001–200n, each RU acquiring seismic data from a predetermined number of receivers associated thereto. In FIG. 1, each remote unit RU is shown to collect seismic data from six receivers 22. For example, remote unit R1a is shown to collect seismic data from receivers on line 2001 and located along vertical lines 100–600, while the remote unit R1b is shown to collect seismic data from the receivers lying along vertical lines 700–1200. Other remote units in the seismic spread of FIG. 1 similarly acquire seismic data from their associated receivers. Each remote unit transmits upstream the seismic data acquired by it from its associated receivers.

In practice, the seismic spreads are typically substantially symmetrical as shown in FIG. 1 and cover a region of interest which is between 12 to 30 kilometers long along each of the receiver station lines 2001–200n and between 3–5 kilometers wide along the vertical direction. For simplicity, and not as a limitation, FIG. 1 shows only a portion of a typical seismic spread.

During a recording cycle, the remote units RU's acquire seismic data from each of their associated receivers in a predetermined sequence and transmit the acquired data either to a recorder 40, which is typically placed in a truck, or to an upstream data acquisition unit, which is generally referred herein as "DAU". A line 50a is coupled to remote units R1a–Rna via taps 51a–51n to transmit the seismic data from such remote units to a data acquisition unit DAU1. Similarly, a line 50b is coupled to the remote units R1b–Rnb via taps 52a–52n to transmit seismic data from such remote units to the data acquisition unit DAU2 and so on for the rest of the seismic spread. The DAU's may be directly coupled to the recorder 40 or may transmit data to an upstream DAU, which transmits data to another upstream DAU or to the recorder 40.

The recorder 40 contains an acquisition recorder 42 for acquiring data from the DAU's and/or the RU's. A memory unit or data storage device 44, such as a tape drive, coupled to the acquisition recorder 42 stores seismic data according to programmed instructions contained within the acquisition recorder 42 or provided to the acquisition recorder 42 by a computer 46. The computer 46 preferably contains programs for controlling the operation of the acquisition recorder 42 and the data storage device 44 and to perform other desired data acquisition functions, including performing quality checks and pre-processing of the seismic data.

To acquire seismic data from the receivers in the seismic spread, a source, such as a vibratory source or an explosive device, is activated to induce shock waves into the earth at a predetermined source point (shot location) on the earth, such as shown by locations S1a–S1m. The reflected seismic waves from the subterranean interfaces in response to the shock waves are detected by the receivers in the seismic spread and seismic data from receivers within a portion of the seismic spread, referred to herein as a shooting "patch", is recorded by the acquisition recorder 42 on the storage media 44. By way of example only, FIG. 1 shows a shooting patch 60a containing receivers bounded by receiver lines 2001 and 2002 and vertical lines 100–600 for the source point S1a. The taps which correspond to the shooting patch are specified so as to record data from the receivers which comprise the shooting patch. In the example of FIG. 1, data from RU's R1a and R2a respectively via taps 51a and 51b will be recorded for shots at shot point S1a. Once the data is recorded a desired number of times for each shot location, the shot point is moved, such as to location S1b and a new shooting patch, such as 60h, is defined corresponding to the shot point S1b and the above noted process is repeated.

In practice, before seismic data is recorded corresponding to a shot point, an operator sets up the recorder by inputting the locations of the line taps in the recorder. Unfortunately, it is common for operators to specify incorrect taps. For example if the desired tap locations are 51a and 51b but the actual taps are located at 52a and 52b then the acquisition recorder 42 will record data received from taps 52a and 52b, i.e., from receivers along the vertical lines 700–1200 at channel locations which correspond to the receivers located along vertical lines 100–600. In the above example, the recorder will presume that the seismic data is from receivers bounded by receiver lines 2001 and 2002 and vertical lines 700–200 while the actual data received is from receivers bounded by vertical lines 300–900. As noted earlier, to detect such errors, it is typical in the prior art to either short certain receivers (i.e. make such receivers inoperable) or reverse the polarity of such receivers. Since the physical location of each receiver station is precisely known, the dead or reversed receiver locations are stored in the computer 46. During the data acquisition mode, the computer 46 correlates the received data to the dead or reversed channels to map the channel assignments to the receiver locations. However, as noted earlier, such methods are at times not accurate as the dead channels and reversed-polarity channels occur in the equipment due to equipment failure and/or operator error. Further, such methods waste valuable seismic data from certain channels, which also is undesirable.

To accurately map (correspond) the seismic data channel assignments to the true geographical locations of their corresponding receivers, a plurality of signature devices, generally designated herein as "SD" are placed at selected receiver locations in the seismic spread. FIG. 1 shows an example how the signature devices SD1a–SDnb may be placed in a seismic spread. In the present invention at least one signature device is preferably placed within each shooting patch. The geographic location of the signature devices SD are the same as their corresponding receiver stations. Each signature device transmits a data sequence which contains an embedded time-invariant code that is unique to that signature device to the acquisition recorder 42 during each recording cycle via the same lines as used to transmit seismic data from the receivers.

FIG. 2 shows an example of a data sequence transmitted by a signature device used in the present invention. The preferred data sequence contains a preamble, designated herein as "PRA" and a postamble, designated herein as "POA," which respectively define the beginning and end of the data sequence of the signature device. The PRA and POA preferably are identical for all signature devices and any sequence of numbers that do not conflict with other data in the seismic system may be used. A time invariant code, referred to herein as "UKP", and any optional data, referred to herein as "OD", lie between the PRA and The UKP is unique to each signature device used in the data acquisition system and is completely time independent. The UKP sequence may be hard wired at the time of manufacture of the signature device or set by a thumb-wheel at the factory or by an operator in the field or programmed into the signature device in the field. The optional data portion of the data sequence of the signature device may include coordinates of the receiver station where such signature device is placed, i.e. the geographic location of the SD, time clock to transmit information about the time and day the data is transmitted and/or comments or other desired information. In the present invention, it is preferred that the geographic location of the signature device is transmitted by the signature device. Once the signature devices have been placed at their specified locations, the UKP of each signature device SD and its geographic location is stored in the computer During each data acquisition cycle, each of the RU's in the shooting patch transmits seismic data from its associated receivers and a header which contains information about such receiver stations. The computer examines the received seismic data and locates the signature devices that are associated with the receiver stations contained in the shooting patch. Thus, the computer 46 verifies that the SD message can be found on correct seismic traces as defined by the trace location information contained in the seismic data file. If the computer 46 cannot correctly map each of the data channels to the true geographic locations of their corresponding receivers, the operator is alerted; otherwise the process continues. In addition to correctly mapping the seismic data channels to the receiver locations, since the location and identity of each SD that is transmitting data sequences is known, the computer 46 may be programmed to determine which receiver stations are transmitting the seismic data, which of the channels are dead (i.e. not providing any data), and which of the channels are reversed. Such information may be displayed on the monitor 46 and/or provided to the operator on a hard copy.

Although it is preferred that there be at least one SD in each shooting patch and that the location and identity of each SD in the system is known, however, in some seismic spreads, it may be adequate to utilize only a few SDs in a seismic spread.

Thus, the system of the present invention provides apparatus and method for acquiring seismic data wherein signature devices placed at certain known locations in the seismic spread transmit unique data sequences, which are then used to verify in situ that the seismic traces being recorded correspond to the true geographic locations of their corresponding receiver stations. It should be noted, however, that for simplicity and ease of understanding, the present invention has been described hereinabove by way of a specific example of a seismic spread and it shall not be considered as a limitation to the use of a signature device in a particular type of seismic spread or a particular type of data acquisition system for mapping the seismic traces or channel assignments to the true location of their corresponding receivers. Thus, the foregoing description is directed to particular embodiments of the present invention for the purpose of illustration and explanation. It will be apparent, however, to one skilled in the art that many modifications and changes to the embodiments set forth above are possible without departing from the scope and the spirit of the invention. It is intended that the following claims be interpreted to embrace all such modifications and changes.

What is claimed is:

1. A seismic data acquisition system, comprising: a remote unit coupled to a plurality of receivers placed spaced apart at known locations, said remote unit acquiring seismic data from the receivers over a separate data channel associated with each such receiver in response to an induced shock wave into the earth, said remote unit transmitting the acquired seismic data to a recorder during a data recording cycle; a signature device located at a known location for transmitting a data sequence having a time-invariant code to the recorder during the recording cycle; and said recorder utilizing the data sequence to map the seismic data associated with each said data channel corresponding to the location of its associated receiver.

2. The system of claim 1, wherein the seismic data is recorded on a storage media.

3. The system of claim 1, wherein the data sequence contains a preamble that signifies the beginning of the data sequence and a postamble that signifies the end of the data sequence.

4. The system of claim 3, wherein the data sequence contains data which identifies the location of the signature device.

5. The system of claim 3, wherein the data sequence contains data that identifies the time and day when the data sequence is transmitted.

6. A seismic data acquisition system, comprising: a plurality of remote units, each said remote unit being associated with a separate plurality of receivers placed spaced apart at known locations on the earth's surface, said remote units acquiring seismic data from their associated receivers in response to a seismic shock wave induced into the earth at a predetermined location, said remote units transmitting the acquired seismic data to a recorder during a data recording cycle; a signature device located at a known location for transmitting a data sequence having a time-invariant code to the recorder during the recording cycle; and said recorder utilizing the data sequence to map the seismic data received from the receivers corresponding the location of their associated receivers.

7. The system of claim 6, wherein the data sequence contains a preamble that signifies the beginning of the data sequence, a postamble that signifies the end of the data sequence and a data sequence that identifies the location of the signature device.

8. The system of claim 6, wherein the recorder contains a computer which has stored therein the data sequence of the signature device and utilizes both the stored data sequence and the data sequence received from the signature device for mapping the seismic data corresponding to the locations of the receivers.

9. A seismic data acquisition system, comprising: a plurality of remote units, each said remote unit in the plurality of remote units coupled to a plurality of associated receivers placed spaced apart at known locations within a desired region on the earth's surface, said remote units acquiring seismic data from their associated receivers in response to a seismic shock wave generated by a source placed at a predetermined location on the earth, said remote units transmitting the acquired seismic data to a data acquisition unit during a data recording cycle; a plurality of signature devices, each said signature device located at a separate known location within the desired region, each said signature device transmitting a data sequence having an embedded time-invariant code which is unique to such signature device to the data acquisition unit during the recording cycle; a computer coupled to the data acquisition unit having stored therein the data sequences for the signature devices, said computer utilizing the stored data sequences for the signature devices and the data sequences received from the signature devices to map the seismic data received from the remote units to the locations of their corresponding receivers.

10. A seismic data recording system comprising:
(a) a plurality of remote data acquisition units deployed within a desired region and spaced apart according to a desired grid spacing, each said remote data acquisition unit coupled to a receiver station having known geographic location within the desired region to acquire at least one channel of seismic data from the receiver coupled to such remote data acquisition unit;
(b) a recorder for receiving the seismic data from the remote data acquisition units; and
(c) a signature device placed at a known geographic location within the desired region for transmitting a data sequence having an embedded time-invariant code that is unique to the signature device to the recorder, said recorder utilizing the data sequence to map the seismic data received corresponding to the known geographic locations of their associated receivers.

11. The system of claim 10, wherein the unique data sequence contains a preamble that signifies the beginning of the unique data sequence and a postamble that signifies the end of the unique data sequence.

12. The system of claim 11, wherein the unique data sequence contains data which identifies the location of the signature.

13. The seismic data recording system according to claim 10, wherein the unique data sequence is pre-recorded in the recorder and the recorder utilizes the prerecorded unique data sequence and the unique data sequence received from the signature device to record the seismic data received from the remote data acquisition units corresponding to the known geographic locations of the receivers.

14. A method of acquiring seismic data, comprising the steps of:
(a) acquiring seismic data from a plurality of seismic sensors placed spaced apart at known locations within a desired region;
(b) transmitting the seismic data acquired from the seismic sensors to a recorder; and
(c) transmitting a data sequence containing an embedded code from a signature device placed at a known location within the region to the recorder, said recorder utilizing the data sequence received from the signature device to map the seismic data received from the seismic sensors corresponding to their known locations.

15. The method of acquiring seismic data as specified in claim 14, wherein the data sequence further contains information about the location of the signature device.

16. The method of acquiring seismic data as specified in claim 14, wherein the data sequence further contains a preamble defining the beginning of the data sequence and a postamble defining the end of the data sequence.

17. A method of acquiring seismic data, comprising the steps of:
(a) acquiring seismic data from a plurality of seismic sensors placed spaced apart at known locations on the earth's surface according to a predetermined grid pattern within a desired region;
(b) transmitting the seismic data acquired from the seismic sensors to a recorder having a computer;
(c) transmitting a data sequence from a signature device placed at a known location within the region to the recorder, said data sequence containing an embedded time-invariant code that is unique to the signature device; and
(d) storing the data sequence and the location of the signature device in a memory associated with the recorder; and
(e) mapping the seismic data received from the seismic sensors corresponding to their known locations by utilizing the data sequence stored in the memory and the data sequence received from the signature device.

\* \* \* \* \*